United States Patent [19]
Hoke

[11] 3,727,661
[45] Apr. 17, 1973

[54] TIRE TREAD
[75] Inventor: Gilbert J. Hoke, Kenmore, N.Y.
[73] Assignee: Dunlok Tire and Rubber Corporation, Buffalo, N.Y.
[22] Filed: Feb. 18, 1971
[21] Appl. No.: 116,328

Related U.S. Application Data
[63] Continuation-in-part of Ser. No. 750,387, June 27, 1968, abandoned.

[52] U.S. Cl. .................................................152/209
[51] Int. Cl. ...........................................B60c 11/10
[58] Field of Search ...................................152/209

[56] References Cited
UNITED STATES PATENTS
2,268,344  12/1941  Shesterkin ............................152/209
3,095,024  6/1963  Robertson ............................152/209
2,327,057  8/1943  Ofensend ............................152/209
2,736,797  7/1956  Campbell ............................152/209
2,938,560  5/1960  Wallace ............................152/209

Primary Examiner—Gerald M. Forlenza
Assistant Examiner—D. W. Keen
Attorney—Rauber & Lazar and Eliot S. Greber

[57] ABSTRACT

A pneumatic tire is provided with a tread having a traction pattern consisting of grooves. The tread pattern inhibits stone penetration within the tread by suspending or cradling the stone spatially from the bottom of the groove. The grooves are provided with transverse crossbars or buttresses having a configuration and dimension relative to the groove to support or cradle a stone above the bottom of the groove.

17 Claims, 15 Drawing Figures

PATENTED APR 17 1973 3,727,661

INVENTOR.
GILBERT J. HOKE
BY
Rauber & Lazar
his ATTORNEYS

TIRE TREAD

This application is a continuation-in-part of U.S. application Ser. No. 750,387, now abandoned filed June 27, 1968, having the same title.

BACKGROUND OF THE INVENTION

1. Field of the Invention

This invention relates to pneumatic tires and in particular to the traction pattern of the tire tread wherein the grooves are arranged to minimize or prevent tire damage from stone pick-up and stone penetration.

2. Description of the Prior Art

The rubber treads of pneumatic tires are commonly provided with a plurality of transversely spaced circumferentially continuous, relatively narrow, anti-skid grooves to increase the traction properties and flexibility of the treads. Such grooves are commonly made circumferentially straight or of a tortuous shape, i.e., zig-zag, sinuous, etc.

The grooves of a tortuous shape are considered preferable because such a shape provides a much greater groove edge effective for increasing the traction and anti-skid properties of the tread, and also presents the groove edges in various directions so as to increase the traction and anti-skid properties in all directions.

A problem with respect to the large grooves is that they permit foreign objects, such as stones, to enter into the groove early in the tire's life. The depth of the deep grooves allows the stones to be held or trapped by the compression of the rubber in the sides or walls of the ribs formed by adjacent grooves. Eventually the stones are forced against the bottom of the groove by pressure of the load on the tire and road surfaces. As the tire wears, the stone is subjected to additional pressure as the depth of the tread rubber decreases or another stone may be trapped above the original one, exerting pressure on the first stone. If the lodged stone has a point or sharp edge, the pressure may cause the stone to cut through or split the bottom of the groove to penetrate the under tread rubber and the cords of the tire's carcass.

The grooves, thus, have occasioned annoyance and damage as the result of picking up or holding stones and other hard objects of various sizes and dimensions. Problems relating to the grooves still remain, notwithstanding the many designs of grooves heretofore proposed.

It is the general object of this invention, therefore, to improve the traction pattern of pneumatic tires with respect to the deleterious effects of stones entering the groove.

SUMMARY OF THE INVENTION

According to the invention, there is provided a pneumatic vehicle tire having a traction-pattern in the tire tread provided with grooves generally extending radially inwardly from the surface of the tire tread.

The grooves are provided with crossbars extending transversely across the bottom portion of the groove. The crossbars may be horizontal or parallel with respect to the tread surface merging with or perpendicularly into the side walls of the grooves. The crossbars may also extend upwardly forming buttresses against the side walls of the grooves as a crescent-shaped crossbar merging gradually or tapering into the side wall spatially below, i.e., radially inwardly, of the tread surface. Furthermore, the crossbar may extend along the side wall of the groove to the tread surface forming in profile a U-shaped crossbar, preferably with the upper portions slightly tapered. The cross section of the crossbars may be in rectangular, curved or triangular form. The spacing between the crossbars is equal or less than the width of the crossbars.

Foreign objects of significant size, such as stones, that may penetrate the groove are suspended within the groove by being cradled by one or more adjacent crossbars. This suspension prevents the stone from penetrating deeper into the groove and eventually damaging the base of the groove by cracking the bottom or corners thereof or tearing further into the tread rubber, eventually tearing or rupturing the carcass comprising the cords thereof. Such damage causes premature tire failure, such as blow-outs, or otherwise renders the tire unfit for recapping or retreading.

BRIEF DESCRIPTION OF THE DRAWINGS

The nature of the invention is hereinafter further explained in greater detail with reference to the accompanying drawings, forming a part of this application, in which.

DESCRIPTION OF THE PREFERRED EMBODIMENTS

Figure 1:
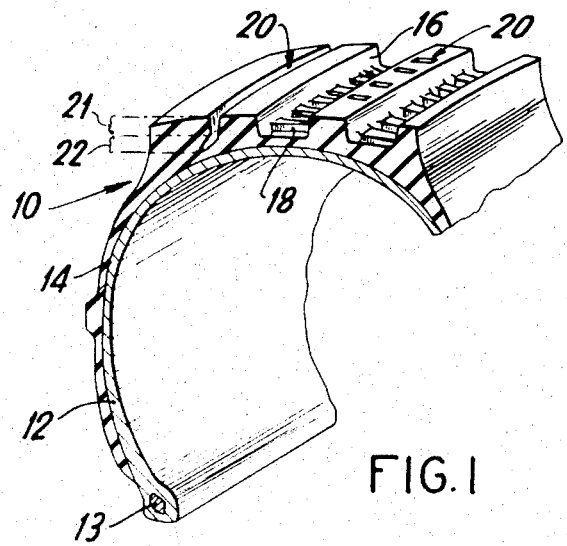
FIG. 1 is a perspective view, partly in section, of a pneumatic tire provided with a tread pattern according to the invention, having either or both the grooves and sipes.

Referring to the drawings and in particular to FIG. 1, there is shown a section of a pneumatic tire incorporating in the rubber tread 10 thereof several anti-skid grooves 16 and several sipes 20 formed in accordance with the present invention. While only several grooves and sipes are shown, it will be appreciated that as many sipes or grooves, or both, as may be desired, may be provided.

The tire illustrated is otherwise of conventional construction and includes, in addition to the rubber tread 10, rubber side walls 14, a fabric carcass 12 and annular bead wire bundles 13 to which the carcass is anchored during molding and vulcanizing of the tire. The tire may be fabricated and molded in a conventional manner and the antiskid grooves 16 and sipes 20 are preferably formed in the tread 10 during molding thereof. The term rubber is used to denote natural rubber, synthetic rubber and blends thereof.

Figure 2:
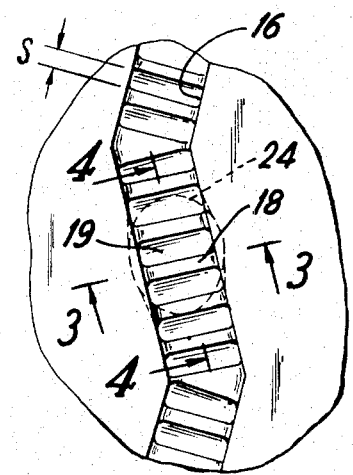
FIG. 2 is a plan view of a portion of a groove according to the invention.
Figure 3:
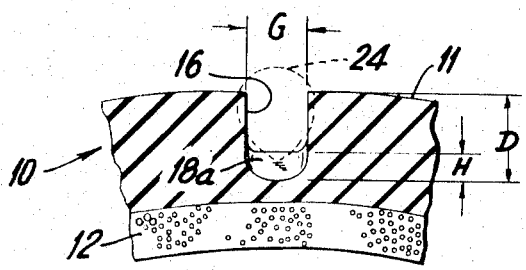
FIG. 3 is a sectional view of the groove taken on the section indicating line 3—3 of FIG. 2.
Figure 4:
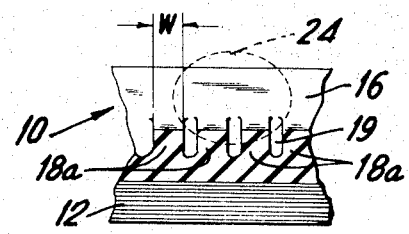
FIG. 4 is a sectional view of the groove taken on the section indicating line 4—4 of FIG. 2.

The groove 16, according to the invention, is provided with a plurality of crossbars 18 as shown in FIGS. 2, 3 and 4. The crossbars are preferably integrally formed from the bottom of the groove 16 and extend across the groove from one side wall to the other. The crossbar 18a of FIGS. 3 and 4 is of the form that is generally parallel with the tread-surface 11. Various combinations of the width W to depth H ratio can be used, depending upon the groove width G and depth (D, FIG. 3) used. The spacing S (FIG. 2) between the crossbars 18 should be such as to assure the suspension of the stones or other foreign objects that may penetrate the groove and be retained therein. The stone is thereby cradled above the bottom of the groove by one or more of the crossbars.

According to the invention, the spacing 19 having a dimension S (FIG. 2) between the crossbars 18 should be not more than, and preferably less than, the width G (FIG. 3) of the groove. The width W of the crossbar will be selected in relation to its height H, and these dimensions relative to the groove width G and depth D are determined in accordance with design requirements within the guidelines to be explained.

As well known and understood in this art, groove width and depth dimensions in a pneumatic tire tread (voids between rubber ribs or lugs) differ greatly in various types of tires, i.e., from very narrow and shallow in bicycle and auto tires to very wide and deep in large truck and earthmover tires. The groove dimensions may vary within a tire tread. Thus, grooves located at or near the center of a tire tread may be wider or narrower, deeper or shallower than the grooves located at or near the outer edges of the tire tread. The groove dimensions also vary when an identical tread design pattern is applied to various sizes in a tire range; for example, identical patterns for mini-cars, limousines, buses and trucks still require different groove dimensions for each of such type tires which vary in size.

In order to provide some degree of protection from stones and other foreign objects causing damage to the bottom or base of the grooves in any of the above types of tires, the rubber configurations within the grooves must be adequate in size and in some relation to the size of the groove opening. Since the groove width determines the size of stone accepted and retained within the groove walls, the groove width is used as a basis for determining the size and spacing of the crossbar elements necessary to resist the stone and keep it away from the groove bottom where the damage is done.

To determine the dimensional limitations of appropriate stone cradling crossbar elements in the many tire types that may be able to utilize the present invention, certain relationships of the size and spacing of the structural portions of the groove are required.

Figure 13:
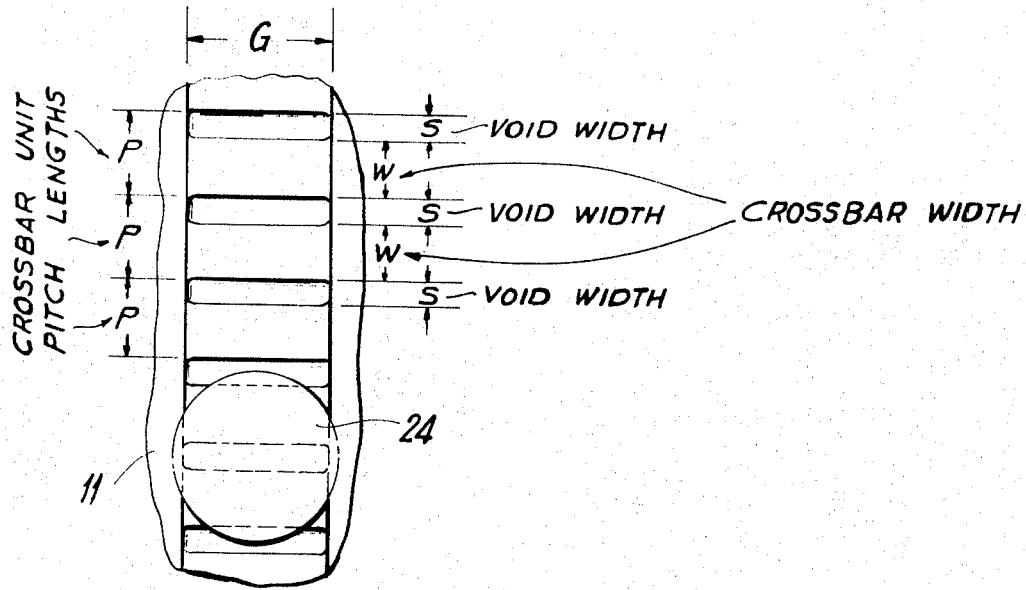
FIGS. 13, 14 and 15 show plan and longitudinal and transverse sectional views of a typical tire tread with the various size and spacing dimensions required for cradling a given size of foreign particle.
Figure 14:
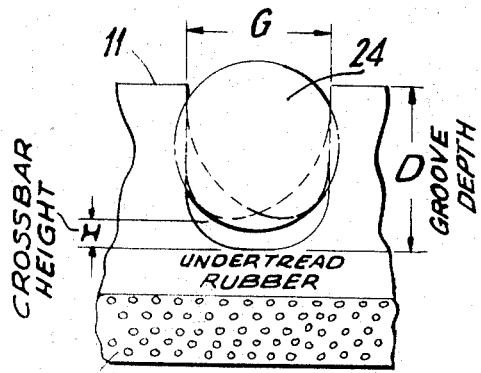
Figure 15:
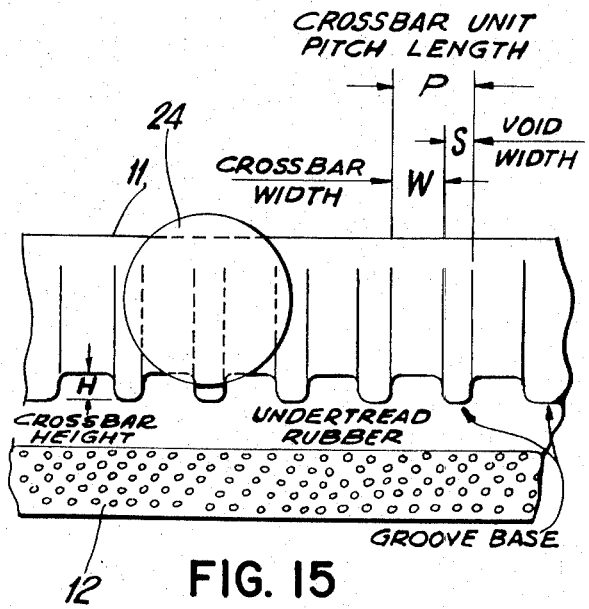

Referring now to FIGS. 13, 14 and 15, there is shown a typical groove adapted to provide the stone cradling structure according to the invention. The various portions of the groove previously described above are shown in their respective dimensional relationships. The crossbar "unit pitch length" P, as designated in FIG. 15, is the sum of one crossbar width W and one spacing or void width S between the crossbars. Thus, the pitch P is defined as one crossbar and the spacing between each crossbar, the combination of W and S being repeated as a continuing series is desired. The crossbar height H, shown in FIG. 15, represents the height of the crossbar from the bottom of the groove. D is the depth of the groove from the bottom thereof to the tread surface 11, and G is the groove width as previously described.

According to the invention, the pitch P should be no less than one-eighth inch and no greater than twice the groove width G. In addition, the crossbar width W should be no less than 50 percent and no greater than 90 percent of the pitch length P. The spacing or void S between the crossbars should be no less than 10 percent and no greater than 50 percent of the pitch length P, while the crossbar height H should be no less than one-sixteenth inch high and no greater than 50 percent of the depth D. In general, the crossbar width W will always be at least equal to or greater than the space between them, that is, the space defined by dimension S. Further, the space S should never be greater than the groove width G.

A stone 24, shown in dotted lines in FIGS. 3 and 4, which may have penetrated or been forced into the groove 16 and retained therein, is shown suspended or cradled from the bottom of the groove by the several crossbars 18a. The dotted line portions of the stone 24 in the tread 10 (FIGS. 3 and 4) indicate the form of the groove and the crossbar owing to the presence of the stone. Although the position of the stone 24 may be only temporary, since further movement of the tire over the road may eventually cause the stone to be ejected, it will be appreciated that the stone 24 can nevertheless be suspended or cradled in that position without being ejected and yet will not harm the bottom of the groove.

Figure 7:
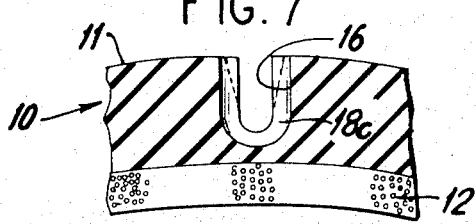
FIGS. 7 and 8 are sectional views similar to FIG. 4, showing other forms of crossbars in the grooves.
Figure 8:
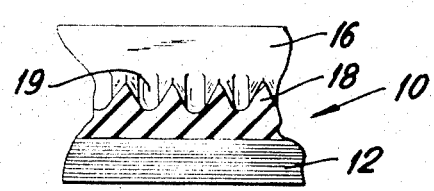

The cross-sectional form of the crossbars 18 may be any of several configurations, such as the rectangular form shown in FIG. 4, the semi-circular or curved form shown in FIG. 7, as well as the triangular form shown in FIG. 8. However, the recess defined by the crossbars and the inner wall portions of the grooves should preferably be such that: (a) the width W of the crossbars is of the same order of magnitude as the particles, and (b) the spacing between the crossbars S is no greater than the width W. The spacing S between the crossbars is measured at the base of the groove or at the top of the crossbar.

Figure 5:
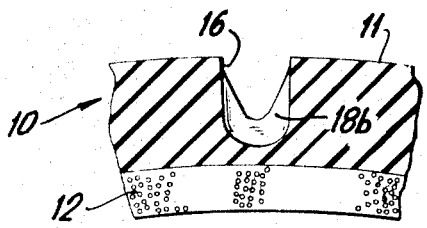
FIGS. 5 and 6 are sectional views of the above similar to FIG. 3, showing a modification of the crossbars in the grooves.
Figure 6:
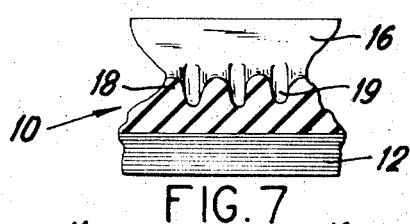

A modification of the crossbars of the invention is shown in profile in FIG. 5, in a view otherwise similar to FIG. 3. The crossbars, for this form indicated as 18b, are crescent-shaped, disposed, as a rib, laterally across the bottom of the groove and extending radially outwardly from the bottom of the groove and against both side walls, serving, in effect, as buttresses thereof and terminating at the side walls at a place below the tread surface 11. Such buttresses may also be arranged to terminate at the surface of the tread which surface may extend inwardly of the groove. Also, the crossbar may be a full rib extending throughout the walls of the groove, terminating at the tread surface and having a uniform height and width. Such a form 18b is shown in FIG. 6. The dotted lines indicate a taper of the upper portion of the crossbar that may be provided. Such forms of crossbars provide V-shaped or U-shaped cradles or suspension structure for stones which prevents thereby deeper penetration of the stone and which eventually may effect rejection of the stone radially outward from the groove. It should be especially noted, as above indicated, that the stone need not be ejected from the groove. Indeed, the stone may be retained in position, cradled harmlessly from the bottom of the groove throughout the life of the tire, by the crossbar and the side walls of the groove.

It will be appreciated that the crossbars according to the invention effectively extend the useful depth of a groove which depth would otherwise be prohibitive if, for example, the remaining tread rubber to the carcass were critically thin. Groove channel depth of the non-skid type can thus be made to more desirable depths than heretofore for longer-life-traction requirements and yet obviate the damage caused by stones.

Figure 9:
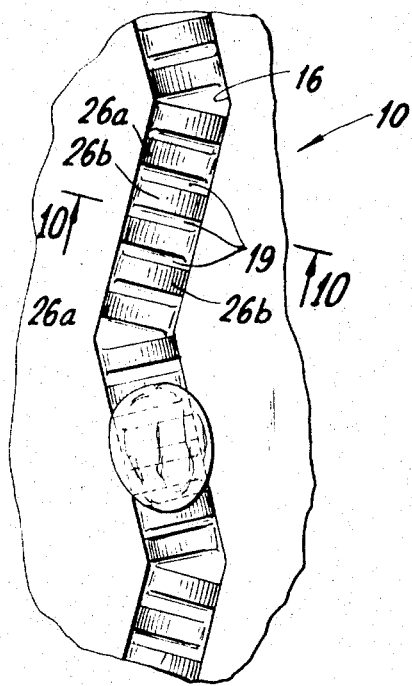
FIG. 9 is a plan view of the groove showing another example of the tire groove of the invention wherein the crossbars are arranged in an alternate configuration, buttressing the respective opposing walls of the groove.
Figure 10:
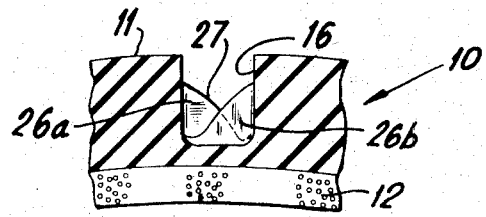
FIG. 10 is a sectional view of the groove taken on sectional line 10—10 of FIG. 9.
Figure 11:
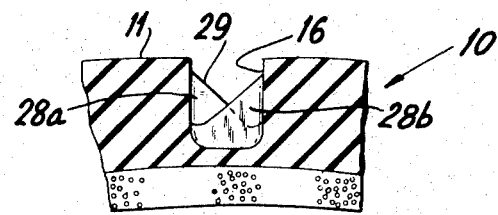
FIGS. 11 and 12 are sectional views similar to FIG. 10 showing alternate forms of the crossbars in the tire groove.
Figure 12:
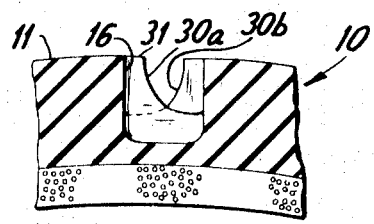

Referring now to FIGS. 9 through 11, there is shown other forms of crossbars according to the invention shaped as buttresses disposed alternately respectively to opposite walls along the longitudinal direction of the groove. The crossbars 26a and 26b extend from one lower side wall portion of the groove 16 laterally across the groove and slope upwardly into the opposite wall, merging therein at a location spatially radially inwardly from the tread surface 11. The upper surface 27 of the crossbars 26a and 26b may be curved outwardly in profile, as shown in FIG. 10, or may be linear 29 as shown in FIG. 11 for the crossbars 28a and 28b. The alternating crossbars may also be arranged to extend to tread surface 11 as shown in FIG. 12. The crossbars 30a and 30b curve from a lower portion of one side wall of the groove 16 upwardly across the groove to the plane of the tread surface and connect to the opposite side wall by a flat portion 31. The cross-sectional form of the crossbars 26, 28 and 30 may also be shaped as shown in FIGS. 4, 7 and 8 as described above with respect to the crossbars of FIGS. 3, 5 and 6.

It will now be appreciated that the grooves according to the invention serve to inhibit, if not substantially prevent, the retention of foreign objects, such as stones that may be picked up, and the consequent penetration of such objects deep into the tire tread to fracture the tread or otherwise damage the carcass. Any stones that are retained in the groove are cradled harmlessly from the bottom thereof. Furthermore, as the tread surface wears, the crossbars will serve as additional traction edges to thereby prolong more effectively the traction-life of the tire.

Although several preferred forms of the invention have been described, it will be apparent that modifications may be made therein by those skilled in the art without departing from the scope of the invention as set forth in the appended claims.

I claim:

1. A tire tread having a traction pattern including grooves, crossbars extending laterally across the bottom of said groove and the spacing between said crossbars being no greater than the width of said grooves, wherein alternate crossbars extend respectively from opposite walls of said grooves inwardly from the tread surface and slope downwardly and outwardly from one wall terminating in the surface of the opposite wall radially outwardly from the bottom of said groove.

2. A tire tread having a traction pattern including grooves, crossbars extending laterally across the bottom of said grooves, and the spacing between said crossbars being no greater than the width of said grooves, a recess defined by the tops of said crossbars and the inner wall portions of said groove for receiving without retaining particles and the spacing between said crossbars being no greater than the width of said crossbars, the unit pitch length defined as the sum of the width of each of said crossbars and the spacing between said crossbars being at least one-eighth inch and no greater than twice the width of said grooves, the width of said crossbars being at least 50 percent and no greater than 90 percent of said unit pitch length, the spacing between the said crossbars being at least 10 percent and no greater than 50 percent of said unit pitch length, and the height of said crossbars being the measurement between the groove bottom and the outer extremity of said crossbars and said height of said crossbars being at least one-sixteenth inch and no greater than 50 percent of the depth of said grooves.

3. A tire tread according to claim 2 wherein the upper surface of said crossbars is parallel with the tread surface and spaced inwardly from the tread surface.

4. A tire tread according to claim 2 wherein the ends of said crossbars slope upwardly tapering and merging into the side walls of said grooves being formed generally in crescent-shaped cross-section transverse of said groove.

5. A tire tread according to claim 2 wherein said crossbars are triangular in cross-section, the apex of which triangle being disposed radially outwardly from the base of the groove.

6. The tire tread according to claim 2 wherein the surface of said crossbars is generally curved.

7. A tire tread according to claim 2 wherein at least one end of the radially outer surface or extremity of at least one of the crossbars extends radially outwardly to merge gradually with the wall of the groove.

8. A tire tread according to claim 2 wherein at least one of the crossbars extends across the wall of the groove and is generally U-shaped in cross-section transverse to the groove.

9. A tire tread according to claim 2 wherein the depth of the U-shaped crossbar gradually decreases towards its junction with the wall of the groove adjacent to the tread surface.

10. A tire tread according to claim 2 wherein the radially outer surfaces or extremities of alternate crossbars extend respectively from opposite walls of the groove radially inwardly from a junction of the said surfaces or extremities of the crossbar with the wall of the groove adjacent to the tread surface.

11. A tire tread according to claim 10 wherein the radially outer surfaces or extremities of alternate crossbars extend from a junction with the wall of the groove spaced from the tread surface.

12. A tire tread according to claim 10 wherein the radially inner surface of the two junctions of the radially outer surface or extremity of the crossbar with the walls of the grooves is spaced apart from the groove bottom.

13. A tire tread according to claim 2 wherein at least one of said crossbars is rectangular in cross-section.

14. A tire tread according to claim 2 wherein at least one end of the radially outer surface or extremity of at least one of the crossbars extends radially outwardly to merge gradually with the wall of the groove.

15. A tire tread having a traction pattern including grooves, crossbars extending laterally across the bottom of said grooves, and the spacing between said crossbars being no greater than the width of said grooves, a recess defined by the tops of said crossbars and the inner wall portions of said groove for receiving without retaining particles, the spacing between said crossbars being no greater than the width of said crossbars, said spacing being measured either at the base of the groove or at the top of the crossbar, whereby particles of size greater than the spacing between the crossbars are cradled from the bottom of said groove and smaller particles which may enter said recess are not retained therein, and wherein the radially outer surfaces or extremities of alternate crossbars extend respectively from opposite walls of the groove radially inwardly from a junction of the said surfaces or extremities of the crossbars with the wall of the groove adjacent to the tread surface.

16. A tire tread according to claim 15 wherein the radially outer surfaces or extremities of alternate crossbars extend from a junction with the wall of the groove spaced from the tread surface.

17. A tire tread according to claim 15 wherein the radially inner surface of the two junctions of the radially outer surface or extremity of the crossbar with the walls of the grooves is spaced apart from the groove bottom.

* * * * *